United States Patent [19]
Prager et al.

[11] Patent Number: 5,940,845
[45] Date of Patent: Aug. 17, 1999

[54] SYSTEM FOR ACCESSING DATABASES WITH DIFFERENT CHARACTER SETS

[75] Inventors: Scott H. Prager, Stratham, N.H.; Glen E. Salmon, Amesbury, Mass.

[73] Assignee: International Business Machines Corporation, Armonk, N.Y.

[21] Appl. No.: 08/986,207

[22] Filed: Dec. 5, 1997

[51] Int. Cl.[6] .................................................. G06F 17/30
[52] U.S. Cl. .............................. 707/536; 704/8; 707/1
[58] Field of Search .......................... 707/10, 101, 201, 707/542, 536, 1; 704/8; 395/500, 527

[56] References Cited

U.S. PATENT DOCUMENTS

| | | | |
|---|---|---|---|
| 5,278,978 | 1/1994 | Demers et al. | 707/101 |
| 5,566,332 | 10/1996 | Adair et al. | 707/101 |
| 5,778,312 | 7/1998 | Shakib et al. | 395/500 |
| 5,793,381 | 8/1998 | Edberg et al. | 345/467 |

*Primary Examiner*—Paul V. Kulik
*Attorney, Agent, or Firm*—Hunton & Williams

[57] ABSTRACT

A system and method for converting character sets stored in at least one database into different character sets. First, an Activity including a requesting object makes a request of a Link. The Link including a receiving object and a retrieving object receives the request and retrieves the corresponding data from the database. The retrieval process creates a "stream" object from the data and a character set indicator. The stream object is transmitted to the Activity which processes the request. During processing, a request may be made of the stream object for the data in a particular character set. The stream object determines whether the retrieved character set matches the character set requested. If the data requires converting, the stream object, comprising a converting object converts the data into the target character set. The data is then presented to the requester in the target character set. If no conversion is necessary, the data is sent directly to the requestor.

21 Claims, 3 Drawing Sheets

SYSTEM FOR ACCESSING DATABASES WITH DIFFERENT CHARACTER SETS

FIELD OF THE INVENTION

The invention relates to a system for accessing a plurality of databases, and more particularly, to a system for accessing databases having different character sets.

BACKGROUND OF THE INVENTION

A database is a central repository for storing information. Information in a database may be stored in a number of different formats (e.g., datetime, numeric, text, binary, etc.). A character set maintains the correspondence between binary codes and textual characters in a particular language. Some character sets are known as code pages. In many situations, multiple types of systems may be accessing many different types of databases. The situation is complicated further because each system and each database may have different formats for storing and retrieving data. For example, a single database may be accessed by systems in the U.S. and in Russia, yet data may be stored in a single character set not readable by all accessing systems. Because English and Russian have different character sets associated with them, even by the same system, storage of information in one character set would require conversion for a system accessing the database with a different character set. As such, databases store information in different character sets which may not be readable by all systems. Additionally, some databases treat multiple character sets differently. Therefore, information may need to be converted into a character set that is readable by a system attempting to retrieve that information.

As a result, existing systems convert all retrieved data to an international character set, such as Unicode, and then into the character set requested by a data manipulator, typically called an "Activity." This causes a significant delay in the amount of time spent processing a request. As shown in FIG. 1, existing systems request and retrieve data from a database as in step 110. The system then converts the data to a universal character set, for example, Unicode, as shown in step 120. Step 130 converts the Unicode into the target character set. In step 140, the Activity performs some operation on the data.

For example, an Activity may request data from an Oracle database to be stored in a DB2 database. The Activity uses a data provider/consumer, typically called a Link, to retrieve the data from the Oracle database. The Link converts the DB2 character set into Unicode, and then converts it into the target character set. A system typically processes an Activity in the following manner: The Activity requests data from an Oracle database, for example, a stream of text containing the letters "ABC," in the character set "code page 437." The data is converted into an international character set, such as Unicode. Because DB2 does not support this character set, the Unicode must be converted to a character set supported by the database. In this example, the Unicode is converted into code page 857, as the text corresponding to the representation of "ABC" in code page 857.

Therefore, information from one database being moved to another database supporting the same character set would still undergo multiple conversions. For example, if two databases support code page 932, an Activity requesting data be moved from one database to another (or within the same database) is retrieved as code page 932. This character set is already in the target character set, but because the conversions are done automatically, the character set could be converted to Unicode and then be converted back to code page 932. This results in two conversions occurring when there is no need for any conversions to take place. As data may be transferred to several databases, numerous (and possibly unnecessary) conversions may occur. Depending on the amount of data retrieved, the time spent converting the information could be significantly large.

These and other problems exist in existing systems.

SUMMARY OF THE INVENTION

One object of the invention is to overcome these and other drawbacks of existing systems.

Another object of the invention is to provide a system for accessing databases with different character sets that converts data only when necessary.

Another object of the invention is to provide a system for accessing databases with different character sets that reduces the number of conversions necessary for retrieving data stored in a different character set.

Another object of the invention is to provide a system for accessing databases with different character sets that allows detection and conversion of a plurality of international and multi-lingual character sets.

The invention relates to a system and method for converting character sets stored in at least one database into different character sets. First, an Activity comprising a requesting object makes a request of a Link. The Link comprising a receiving object and a retrieving object receives the request and retrieves the corresponding data from the database. The retrieval process creates a "stream" object from the data and a character set indicator (described in greater detail below). The stream object is transmitted to the Activity which processes the request. During processing, a request may be made of the stream object for the data in a particular character set. The stream object determines whether the retrieved character set matches the character set requested. If the data requires converting, the stream object, comprising a converting object converts the data into the target character set. The data is then presented to the requestor in the target character set. If no conversion is necessary, the data is sent directly to the requester. The system is capable of converting directly from one character set to another because it treats the information in the database as an object.

As previously described, existing systems retrieve information from a database and immediately convert that information into an international or multi-lingual character set such as Unicode. The system converts the Unicode into the target character set. The invention reduces (and possibly eliminates) unnecessary conversions by converting the character sets directly from the stored character set into the target character set without having to first convert the information into an international or multi-lingual character set. This is accomplished by having the text data as a whole contain its character set as an integral property.

BRIEF DESCRIPTION OF THE DRAWINGS

FIG. 3 depicts a system for retrieving data in accordance with an embodiment of the invention.

DETAILED DESCRIPTION OF THE PREFERRED EMBODIMENTS

Figure 1:
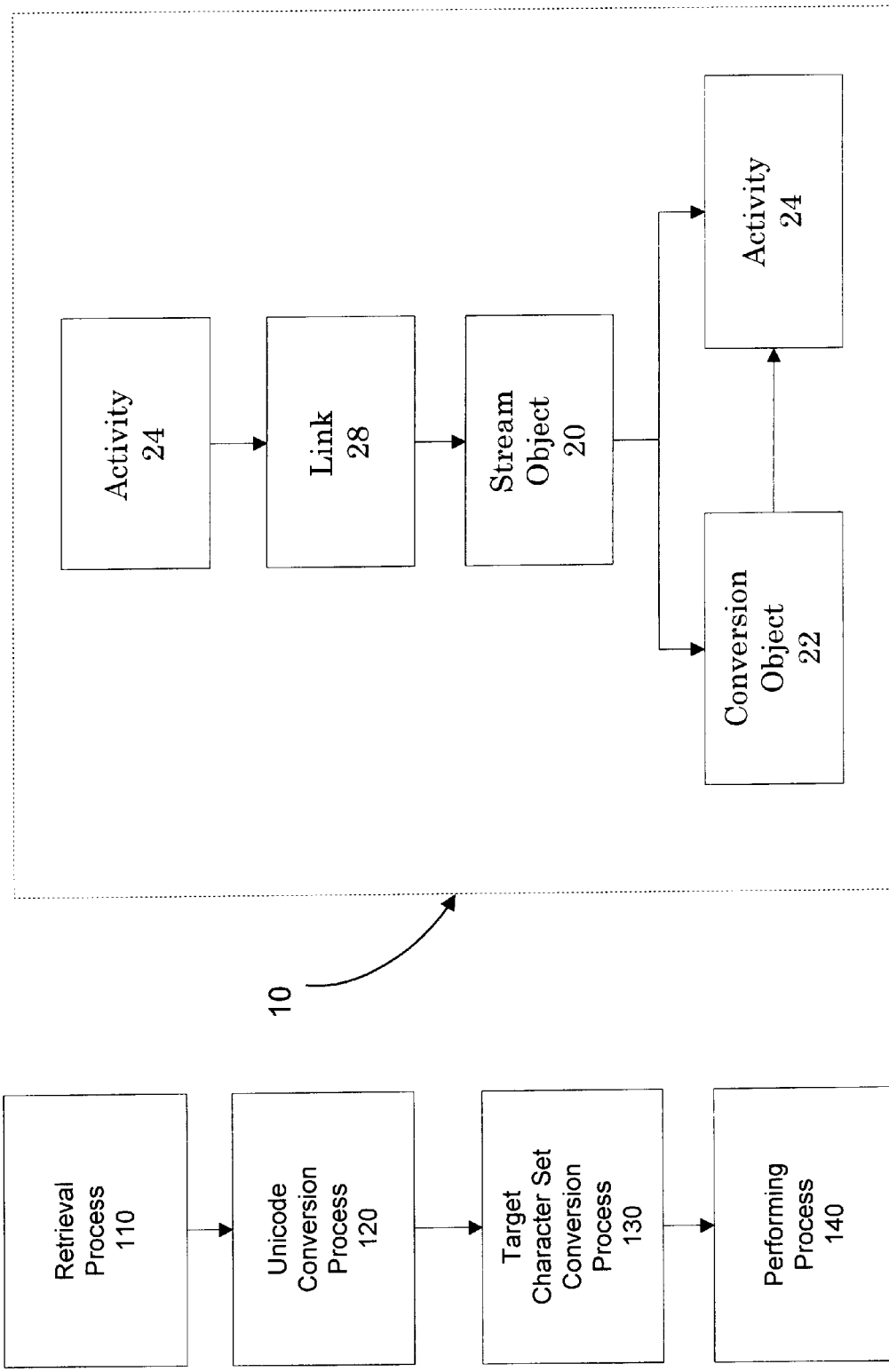
FIG. 1 is a block diagram of a prior art method of retrieving data in a target format.
Figure 2:
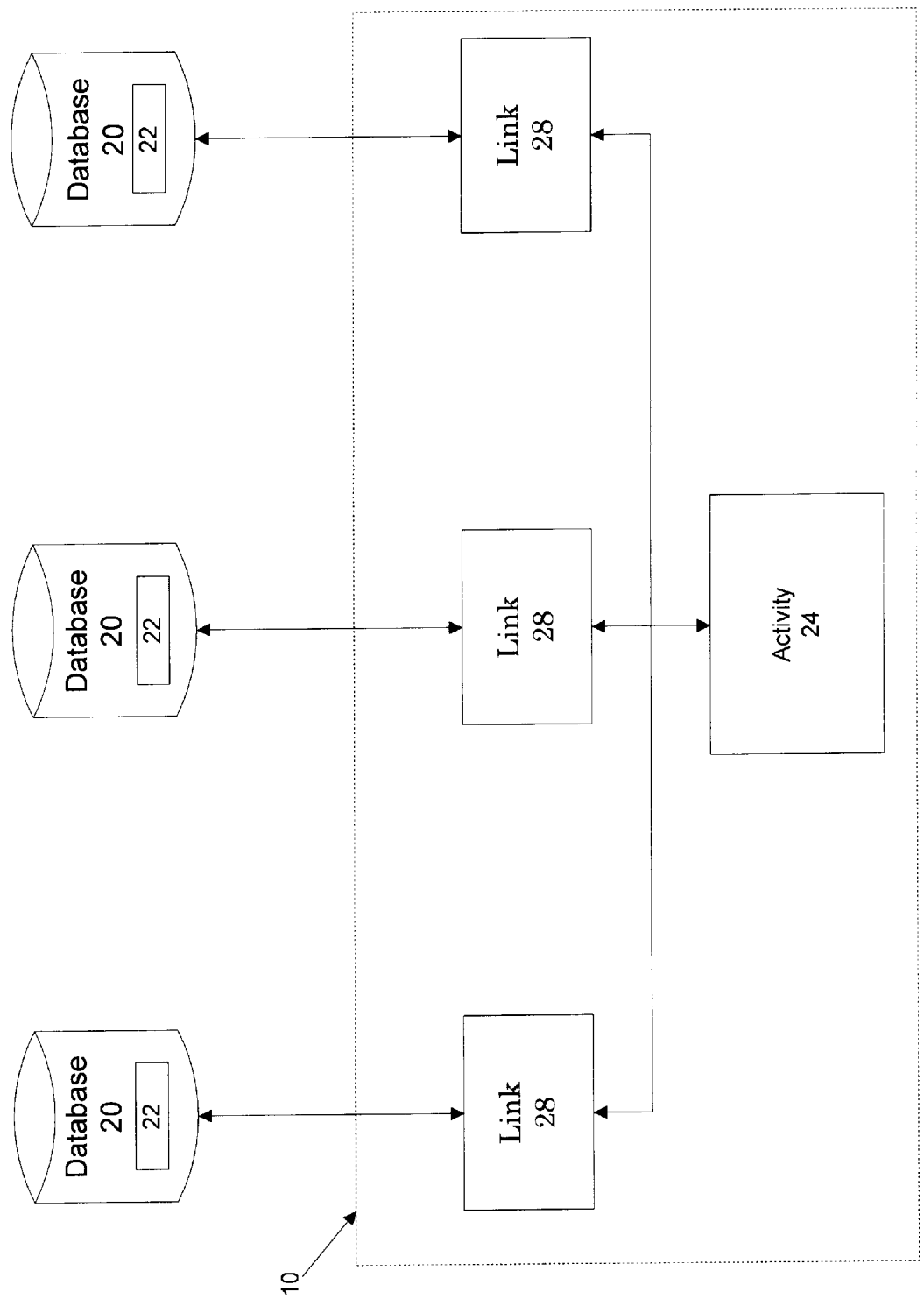
FIG. 2 is an overall block diagram of the system in accordance with one embodiment of the invention.

The invention is a system and method for accessing multiple databases having different character sets. FIG. 2 is a block diagram illustrating an overall system 10 according to one embodiment of the invention. System 10 includes an Activity 24 and a Link 28. Activity 24 is a device that manipulates, stores, etc., data stored in a database 20. Manipulation may include moving data from one database to another, moving data within a database, retrieving data for displaying on a user's terminal, etc. Data stored in database 20 is typically stored in a single character set 22, although some databases may support multiple character sets. Link 28 is a data provider/consumer which enables Activity 24 to access database 20. Links 28 transfer or retrieve data between one or more databases 20 as requested by Activity 24. Activity 24, may, for example, be an end user requesting particular data be displayed on his/her terminal, a system software code requesting data be moved within or to another database, etc. One or more Links 28 connect Activity 24 to at least one database 20. In operation, Activity 24 requests one or more Links 28 to perform certain operations, for example, retrieve a stream of text containing the letters "ABC." Links 28 retrieve from database 20 the desired text in the character set in which it is stored. Once the data is retrieved, Link 28 creates a stream object 20 containing the text, a reference to its character set, a pointer indicating the location of the information, and other types of information.

According to the invention, databases 20 store information with an associated character set. That information and its associated character set is treated as an object by system 10. That object, referred to as a stream object, contains the text of the data, its character set, a pointer, and any other desired information which is viewed as a property of that information. The system assigns or retrieves the data and its character set.

FIG. 3 depicts a system according to an embodiment of the invention. The system 10 comprises an Activity 24, a Link 28, a stream object 20, and a conversion object 22. Activity 24 requests and retrieves data from a database in the character set in which it is stored. The data is retrieved and transmitted using a Link 28. Link 28 creates a stream object 20 containing the text of the data and which is tagged with a reference to its character set. Stream object 20 is then forwarded to Activity 24 for manipulation, storage, etc. If during this process, a request is made for the data in a particular format, stream object 20 determines whether the target character set matches the character set retrieved from database 20. If the character sets are the same, no conversion is necessary. If however, the character sets are different, the data needs to be converted and is forwarded to conversion object 22 comprised in stream object 20. Conversion object 22 converts the stored character set directly into the target character set by using the character set reference without having to first convert it to an international or multi-lingual character set. Conversion object 22 transmits the data to the requestor in the indicated format/character set. If the information is already in the target character set, stream object 20 sends the data directly to the requester.

Figure 4:
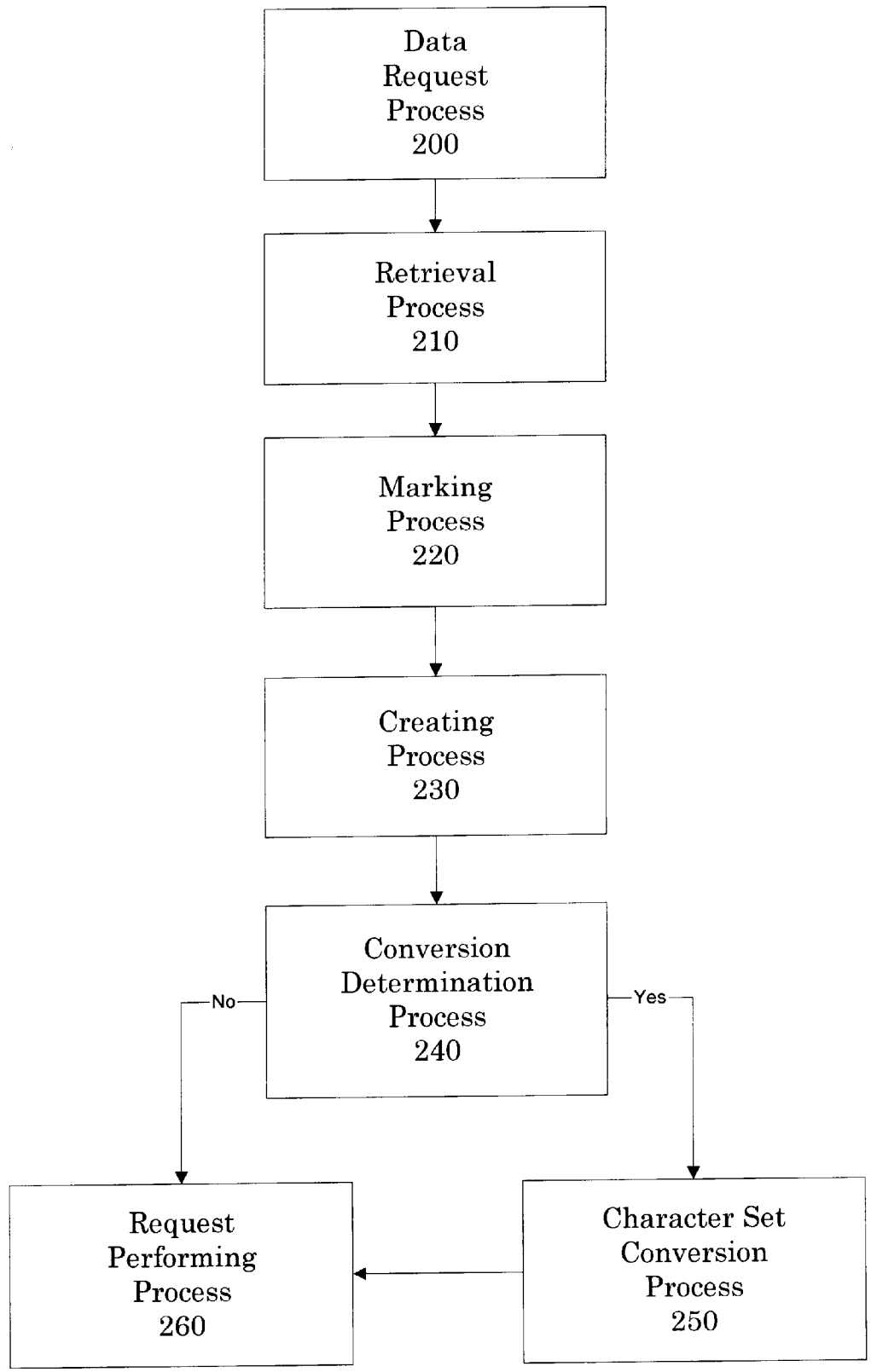
FIG. 4 depicts a flow chart for a method of retrieving data in accordance with an embodiment of the invention.

FIG. 4 depicts a method of retrieving data according to an embodiment of the invention. An Activity requests data from a database. In this example, an Activity requests the text stream from a database as in step 200. The system retrieves the text stream and its associated character set using a Link as in step 210. This data is marked with a reference to its character set as in step 220. A creation process 230 creates a stream object containing the textual information, the character set in which it is stored, a reference to its own character set, and various other information. The stream object is then forwarded to the Activity for manipulation or storing. If a request is made for the data in a particular character set during the manipulation or storing process, the stored character set of the information is determined in step 240. A decision is made as to whether the stored character set matches the target character set, or if conversion to the target character set is necessary. If the information is already in the target character set, the data is sent to the requester. Otherwise, the information is converted directly into the requested character set in step 250. This may be accomplished using known techniques such as a Lotus common component, for example, ccStr. This component performs text translations via a character set conversion library. Once the conversion process is complete, the data is transmitted to the requestor.

The following illustrates how the invention reduces the number of conversions required when moving text data from one type of database to another. For example, when data is retrieved from a DB2 database using existing systems, the data is initially converted into a common character set, such as Lotus Multi-Byte Character Set (LMBCS). If the target system is a Lotus Notes system, this system supports LMBCS, therefore only a single conversion from DB2 to Notes is necessary. Likewise, according to the invention, the DB2 data is converted to LMBCS, a Notes supported character set, and therefore only one conversion is necessary. When moving data from a DB2 database to an Oracle database using existing methods, the data is first converted to Unicode, and then into the character set supported by the Oracle database. Thus, two conversions are required.

According to the invention, the information is retrieved, along with its associated character set and reference, and the system converts the data directly from the DB2 character set to an Oracle supported character set in a single step. Similarly, when moving data within a DB2 database, existing systems require two conversions because the data is automatically converted into Unicode and then converted back to the DB2 character set. The system of the invention eliminates both of these conversions because the stream object first determines the character set in which the data is stored. Upon determining that the data is in the target character set, the system simply points to the information without converting it, therefore no conversions are required. The following table compares the number of conversions required when moving data within or between databases when using a stream format according to the invention and formats of other existing systems.

| Conversion | Number of Conversions Using A Stream Object | Number of Conversions Using Existing Methods |
| --- | --- | --- |
| DB2 to Lotus Notes | 1 | 1 |
| DB2 to Oracle | 1 | 2 |
| DB2 to DB2 | 0 | 2 |

The system is capable of direct conversion between character sets, without any intermediate conversions taking place, because all text data maintains a reference to its own character set. This reference is determined automatically when the data is retrieved from a database. If data is inserted into a database with a character set different from that used by the database, the system automatically converts the data just prior to storing it. For the data to be stored in a supported character set, the entity performing the storing operation simply requests the data from the stream object in a particular character set. It is not necessary for the actual character set/format or the conversion determination to be communicated to the entity. This process increases performance by minimizing conversions.

Additionally, the invention having been disclosed, it will become apparent to those persons skilled in the art that various alterations and modifications may be made without departing from nature of the invention. For example, although the above embodiments have been directed to character sets, the system and method of the invention may also be used with binary and other types of formats as well. The conversions also are not limited to be between character sets, but may include conversions between binary formats, binary to text formats, etc. It is therefore intended that the following claims be interpreted as covering all such alterations and modifications as fall within the spirit and scope of the invention.

What is claimed is:

1. A system for handling data stored in multiple character sets in at least one database, the data being stored with a reference indicating the character set in which the data is stored, comprising a server system which comprises:

data manipulation means for receiving a request to perform a function using data stored in the at least one database, said data manipulation means generating a request for data from the at least one database and directing that request to one or more data provider means;

data provider means responsive to the data manipulation means for receiving the request for data from the data manipulation means and for retrieving the data requested and a character set reference associated with that data from the at least one database;

the data provider means further creating a streaming object comprising the data, the character set reference and a conversion object and passing the streaming object to the data manipulation means;

said data manipulation means initiating the function on the streaming object; and the streaming object being responsive to the function being performed by the data manipulation means to initiate the conversion object to convert the data to a different character set if the function specifies a character set different from the character set reference in the streaming object.

2. The system according to claim 1, further comprising a means for assigning a character set reference to all data stored in the at least one database as the data is being stored in the at least one database.

3. The system according to claim 1, wherein said conversion object directly converts from one character set to another character set without a need for an intermediate conversion process.

4. The system according to claim 1, wherein the conversion object comprises binary conversion means for converting binary formats.

5. The system according to claim 1, wherein the conversion object comprises textual conversion means for converting textual formats.

6. A method for handling data stored in multiple character sets in at least one database, the data being stored with a reference indicating the character set in which the data is stored, comprising the steps of:

receiving a request to perform a function using data stored in the at least one database at a data manipulator;

generating a database request to a data provider:

receiving the database request at the data provider and retrieving said data requested and the character set in which said data is stored from the at least one database;

creating a streaming object comprising the data, the character set reference and a conversion object;

passing the streaming object from the data provider to the data manipulator:

initiating the streaming object for the data requested in a particular character set; and initiating the conversion object to convert the data if the particular character requested is different from the character set stored in the streaming object.

7. The method according to claim 6, wherein the conversion object directly converts the data from one character set to another character set without an intermediate conversion process.

8. The method according to claim 6, wherein the conversion object converts from one textual format to another textual format.

9. The method according to claim 6, wherein the conversion object converts from one binary format to another binary format.

10. The method according to claim 6, wherein the conversion object converts between a textual format and a binary format.

11. A method for handling data stored in binary format in at least one database, the data being stored with a reference indicating the format in which the data is stored, comprising the steps of:

receiving a request to perform a function on binary data stored in the at least one database at a data manipulator;

generating a database request to a data provider;

receiving the database request at the data provider and retrieving said data requested and the format in which said data is stored from the at least one database;

creating a streaming object comprising the data, the character set reference and a conversion object;

passing the streaming object from the data provider to the data manipulator;

initiating the streaming object for the data requested in a particular format;

initiating the conversion object to convert the data if the format requested is different from the format stored in the streaming object.

12. The method according to claim 11, wherein the conversion object directly converts said data from one binary format to another binary format without an intermediate conversion process.

13. A computer usable medium having computer readable program code embodied therein for handling data stored in multiple character sets on a computer system, the system comprising at least one database in which the multiple character set data are stored, the data being stored with a reference indicating the character set in which the data is stored, the computer readable code in the computer usable medium comprising:

computer readable code for receiving a request to perform a function on data stored in the at least one database at a data manipulator;

computer readable code for generating a database request to a data provider;

computer readable code for receiving the database request at the data provider and retrieving said data requested and the character set in which said data is stored from the at least one database;

computer readable code for creating a streaming object comprising the data, the character set reference and a conversion object;

computer readable code for passing the streaming object from the data provider to the data manipulator;

computer readable code for initiating the streaming object for the data requested in a particular character set; and computer readable code for initiating the conversion object to convert the data if the particular character requested is different from the character set stored in the streaming object.

14. The computer readable medium of claim 13 wherein the computer readable code directly converts the data from one character set to another character set without an intermediate conversion process.

15. The computer readable medium of claim 13 wherein the computer readable code converts from one textual format to another textual format.

16. The computer readable medium of claim 13 wherein the conversion object converts from one binary format to another binary format.

17. The computer readable medium of claim 13 wherein the conversion object converts between a textual format and a binary format.

18. The system according to claim 1 wherein the streaming object contains only the character set in which the data is stored.

19. The method according to claim 6 wherein the streaming object contains only the character set in which the data is stored.

20. The computer readable medium of claim 13 wherein the streaming object contains only the character set in which the data is stored.

21. A system for handling data stored in multiple character sets in at least one database, the data being stored with a reference indicating the character set in which the data is stored, comprising a server system which comprises:

a data manipulation object that receives a request to perform a function using data stored in the at least one database, the data manipulation object also generating a request for data from the at least one database and directing that request to one or more data provider objects;

a data provider object responsive to the data manipulation object for receiving the request for data from the data manipulation object and for retrieving the data requested and a character set reference associated with that data from the at least one database;

the data provider object further creating a streaming object comprising the data, the character set reference in which the data is stored, and a conversion object and passing the streaming object to the data manipulation means, wherein the streaming object does not comprise any other character set references;

the data manipulation object then initiating the function on the streaming object; and the streaming object being responsive to the function being performed by the data manipulation object to initiate the conversion object to convert the data directly to a different character set if the function specifies a character set different from the character set reference in the streaming object, without using an intermediate conversion process.

* * * * *